United States Patent
Adas et al.

(10) Patent No.: US 7,610,666 B2
(45) Date of Patent: Nov. 3, 2009

(54) WINDSHIELD INSTALLATION DEVICE AND METHOD OF USE

(75) Inventors: Jeff Adas, Beloit, WI (US); Steve Coyle, Eau Claire, WI (US)

(73) Assignee: AEGIS Tools International, Inc., Madison, WI (US)

( * ) Notice: Subject to any disclaimer, the term of this patent is extended or adjusted under 35 U.S.C. 154(b) by 0 days.

(21) Appl. No.: 12/012,031

(22) Filed: Jan. 29, 2008

(65) Prior Publication Data

US 2008/0122245 A1    May 29, 2008

Related U.S. Application Data

(63) Continuation of application No. 11/274,734, filed on Nov. 14, 2005, now Pat. No. 7,322,092.

(51) Int. Cl.
*B23Q 3/00* (2006.01)
*B23Q 7/00* (2006.01)

(52) U.S. Cl. .......................................... 29/468; 29/559

(58) Field of Classification Search .............. 29/298.11, 29/402.03, 402.08, 464, 468, 428, 426.4, 29/50, 56.6, 270, 281.1, 281.5, 218.6, 743, 29/DIG. 44, 426.6, 559; 269/31, 61, 909; 254/95

See application file for complete search history.

(56) References Cited

U.S. PATENT DOCUMENTS

| | | | |
|---|---|---|---|
| 3,020,017 A | 2/1962 | Watson | |
| 3,620,524 A | 11/1971 | Czompi | |
| 4,453,303 A | 6/1984 | Leddet | |
| 4,670,974 A | 6/1987 | Antoszewski et al. | |
| 4,852,237 A | 8/1989 | Tradt et al. | |
| 4,998,711 A | 3/1991 | Borg | |
| 5,085,415 A | 2/1992 | Shaver | |
| 5,112,092 A | 5/1992 | Pucci | |

(Continued)

FOREIGN PATENT DOCUMENTS

DE    202004013157    1/2006

(Continued)

OTHER PUBLICATIONS

Matthew A. Rosenbaum, "Ford Econoline Windshield Two-Man Set Gone Solo," from Glasslinks, auto glass Tech Center Knowledge Base, http://www.glasslinks.com/tips/solo_set.htm, Jun. 11, 2000.

(Continued)

*Primary Examiner*—Lori L Lyjak
(74) *Attorney, Agent, or Firm*—Michael Best & Friedrich LLP

(57) ABSTRACT

An installation device for installing a windshield in a vehicle. The device includes a pivot assembly including a pair of suction cups that attach to the door glass of a vehicle door, and a depending member that extends upwardly and forwardly adjacent a windshield opening. A support assembly includes a pair of suction cups that attach to a windshield, and a support rod that is axially and rotatably moveable with respect to the suction cups. The support rod includes an end that pivots on the depending member of the pivot assembly. The device moveably supports the windshield such that a single technician can install the windshield on a vehicle.

35 Claims, 4 Drawing Sheets

U.S. PATENT DOCUMENTS

| | | |
|---|---|---|
| 5,190,604 A | 3/1993 | Shaver |
| 5,416,965 A | 5/1995 | Mayhugh |
| 5,429,253 A | 7/1995 | McNett |
| 5,479,689 A | 1/1996 | Schmit et al. |
| 5,525,027 A | 6/1996 | Jinno et al. |
| 5,556,505 A | 9/1996 | Hill |
| 5,622,093 A | 4/1997 | Hutchins |
| 5,772,823 A | 6/1998 | Rusch et al. |
| 5,826,342 A | 10/1998 | Zuro |
| 5,953,802 A | 9/1999 | Radzio |
| 6,101,702 A | 8/2000 | Claycomb et al. |
| 6,237,216 B1 | 5/2001 | Jin |
| 6,543,117 B1 | 4/2003 | Claycomb et al. |
| 6,584,925 B2 | 7/2003 | Kapsner et al. |
| 6,616,800 B2 | 9/2003 | Eriksson |
| 7,039,995 B2 | 5/2006 | Thompson |
| 7,216,411 B1 | 5/2007 | Mayhugh |
| 2004/0003488 A1 | 1/2004 | Thompson |
| 2006/0156533 A1 | 7/2006 | Mayhugh |

FOREIGN PATENT DOCUMENTS

| | | |
|---|---|---|
| EP | 1826044 | 8/2007 |
| EP | 1849634 | 10/2007 |
| FR | 2828826 | 2/2003 |
| GB | 2273517 | 6/1994 |

OTHER PUBLICATIONS

User Review lil-Buddy windshield installation tool, AutoGlass, Sep./Oct. 2005, p. 30, vol. 16, No. 5.

lil-Buddy Windshield Installation Tool Operations Manual.

Industry Products Brand New at the Expo, AutoGlass, Jul./Aug. 2005, p. 56.

eBay Motors buying page for lil-Buddy auto glass windshield installation tool NIB, auction started Sep. 29, 2005.

The Installer Electric Auto Glass Placement Crane brochure by C M Auto Glass, Inc.

The Installer brochure by C & M Auto Glass.

The Installer "Changing the way auto glass is installed" brochure by C M Auto Glass.

The Installer brochure price list by C M Auto Glass.

The Installer IV—An Auto Glass Placement Crane—brochure by C M Auto Glass.

The Installer IV brochure by C M Auto Glass, 3 slightly different brochures.

Positech, The Right Solution for Tough Material Handling Challenges brochure by Columbus McKinnon Corporation.

Lilbuddy Corporation Training DVD for a windshield installation device.

Innovative Labor Alternative, Inc. DVD for a windshield installation device known as the X-TRA Hand.

Innovative Labor Alternative, Inc. product brochure for the X-TRA Hand windshield installation device.

WINDSHIELD INSTALLATION DEVICE AND METHOD OF USE

RELATED APPLICATIONS

This application claims priority to U.S. patent application Ser. No. 11/274,734, filed Nov. 14, 2005, the entire contents of which is incorporated by reference herein.

BACKGROUND

Installing a windshield on an automotive vehicle requires precise placement of the windshield. Given the weight and considerable size of windshields, and the arrangement of most cars, installing a windshield is often a two-person job that requires individuals on both the driver's and passenger's side of the vehicle. Many businesses that provide auto glass repair and replacement provide on site service, in which a service technician or a team of technicians travel to the customer's vehicle for repair or replacement of the windshield wherever the vehicle happens to be located. Providing on site service in this manner provides a high level of convenience to the customer and can be a distinct competitive advantage for glass replacement businesses.

SUMMARY

The invention provides a windshield installation device including a pivot assembly that attaches to a side window of a vehicle, and a support assembly that attaches to a windshield to be installed. The pivot assembly includes first and second suction members that are coupled to the side window. A pivot member includes a first portion coupled to the first and second suction members and a depending portion that extends generally upwardly and forwardly from the suction members. The support assembly includes third and fourth suction members that are coupled to the windshield. The third and fourth suction members are coupled to one another and at least one of the suction members defines a support bore. The support bore receives an elongated support rod that is rotatable and axially moveable within the support bore. The support member includes an end portion that pivotally engages the depending portion of the pivot member such that the windshield is at least partially supported by the pivot assembly during windshield installation. The combination of support and movement afforded by the pivotal engagement between the support rod and the pivot member, and the rotational and axially movable engagement between the support rod and the support bore allows the windshield to be installed by a single technician.

Other aspects of the invention will become apparent by consideration of the detailed description and accompanying drawings.

Figure 1:
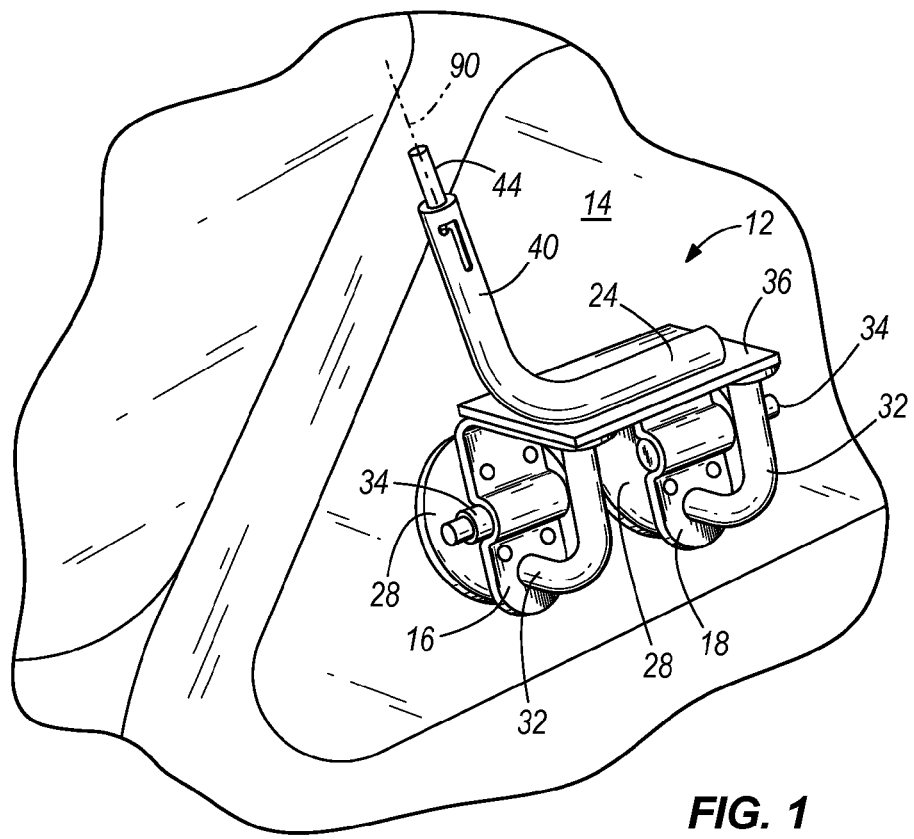
FIG. 1 is a perspective view of a pivot portion of a windshield installation device embodying the invention.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The figures illustrate a windshield installation device 10 of the present invention. With reference to FIG. 1, the device 10 includes a pivot assembly 12 that attaches to a side window 14 of a vehicle. The pivot assembly 12 includes a first suction member 16, a second suction member 18, and a pivot member 24 coupled to the first and second suction members 16, 18. Each suction member 16, 18 includes a resilient cup 28, a handle 32 coupled to the cup 28, and a manually actuated vacuum device 34 that removes air from between the cup 28 and a surface to which the suction member is being attached (e.g. the side window 14). The construction of the suction members 16, 18 and the vacuum device 34 are more fully described in commonly assigned U.S. Pat. No. 5,772,823, the contents of which are incorporated by reference herein. A plate 36 is coupled to the handles 32 and couples the suction members 16, 18 to one another. The plate 36 can include upturned side edges in some embodiments. The pivot member 24 is substantially L-shaped and includes a first portion that is coupled to the plate 36 and a depending portion 40 that extends away from the plate 36 and which defines a reduced-diameter cylindrical portion 44 at one end. The reduced-diameter cylindrical portion 44 is operable to retract inside of the depending portion 40.

Figure 2:
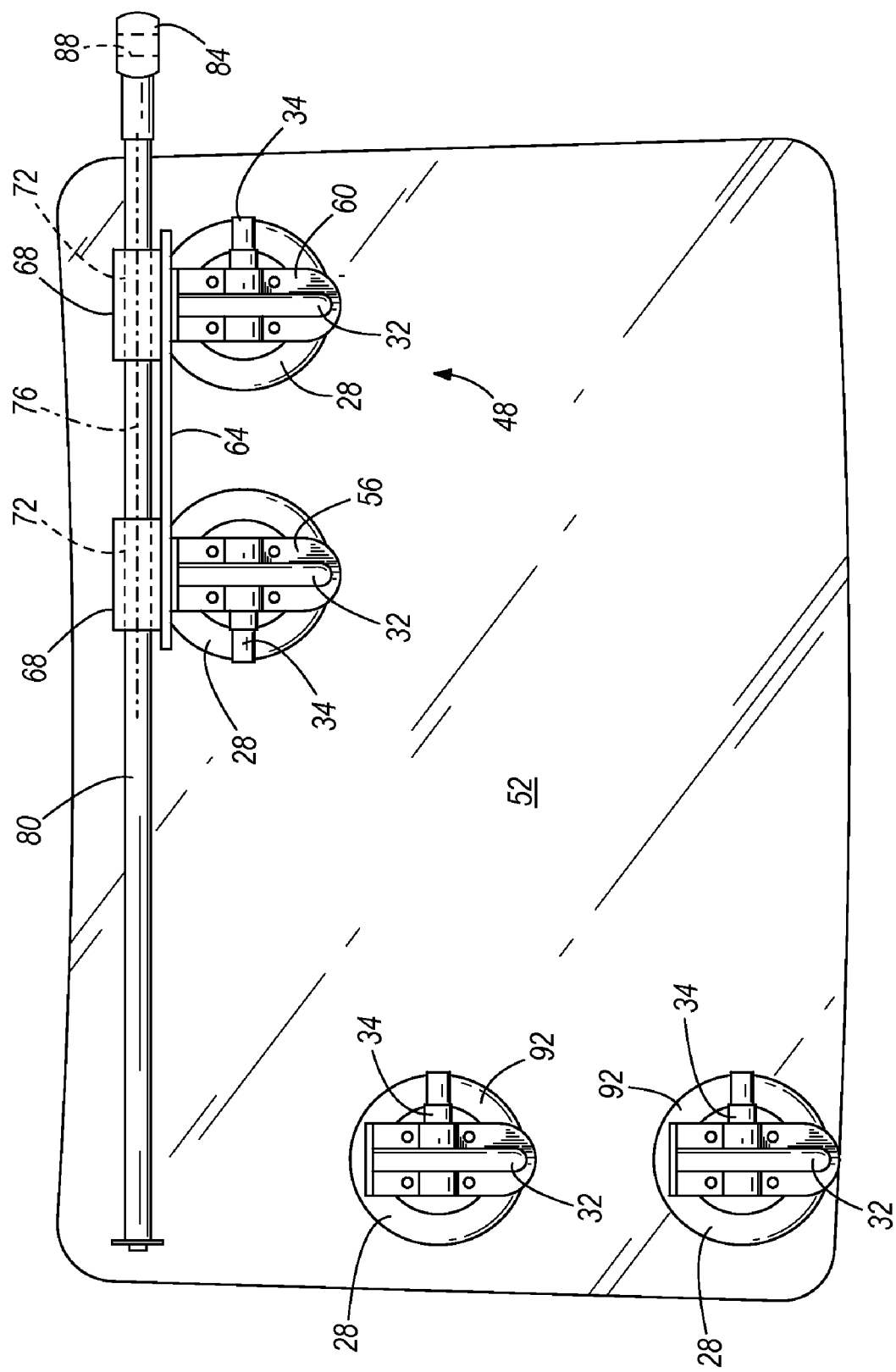
FIG. 2 is a front view of a support portion of the windshield installation device coupled to a windshield.

FIG. 2 illustrates a support assembly 48 of the windshield installation device coupled to a windshield 52 that is to be installed on the vehicle. The support assembly 48 includes a third suction member 56 and a fourth suction member 60, both of which are configured similarly to the first and second suction members 16, 18. A channel or plate 64 couples the third and fourth suction members 56, 60 to one another, and support blocks 68 are coupled to the plate 64. The third and fourth suction members 56, 60 are configured such that a first plane defined by the plate 64 is at an obtuse angle with respect to a second plane defined generally by the windshield 52.

Figure 5:
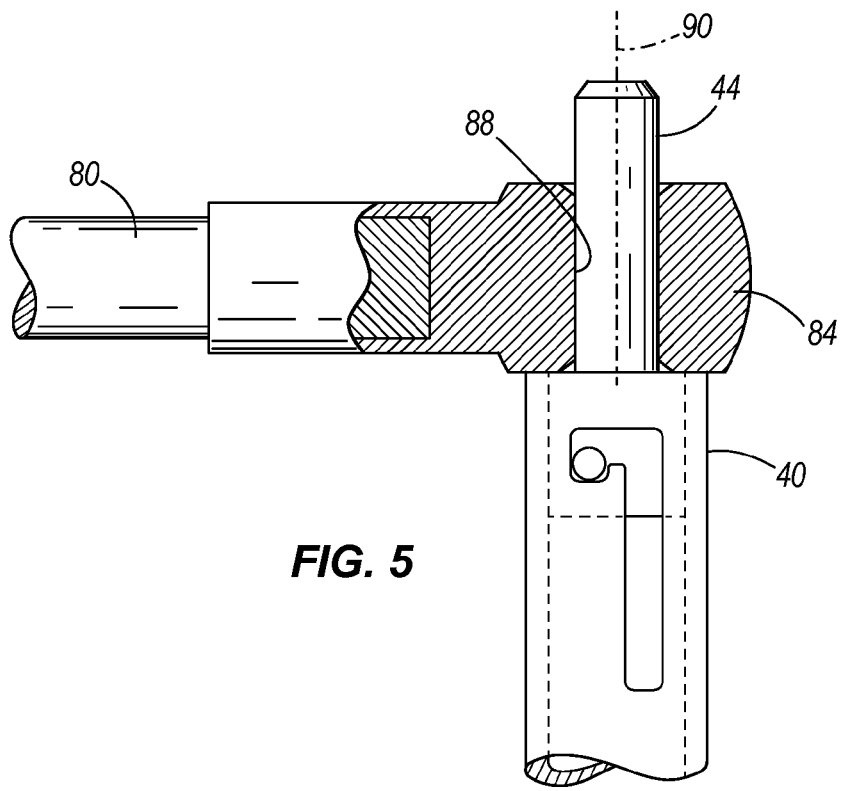
FIG. 5 is a section view taken along line 5-5 of FIG. 4.

The support blocks 68 each define a bore 72, and the bores 72 are substantially axially aligned with one another and define an axis 76. A generally cylindrical elongated support rod 80 extends through the bores 72 and is both rotatable about the axis 76 and axially moveable with respect to the support blocks 68. The support blocks 68 may include bushings and/or bearings to facilitate smooth sliding and rotation of the support rod 80. The support rod 80 includes an end portion 84 having external threads adapted to receive a connector 86. The connector 86 includes an opening 88 adapted to receive the cylindrical portion 44 of the pivot member 24 (see FIG. 5). The support rod 80 and pivot member 24 are therefore pivotable with respect to one another about an axis 90 defined by the cylindrical portion 44. As illustrated, additional suction members 92 can be coupled to the windshield 52 to facilitate handling of the windshield 52 during windshield installation.

Figure 3:
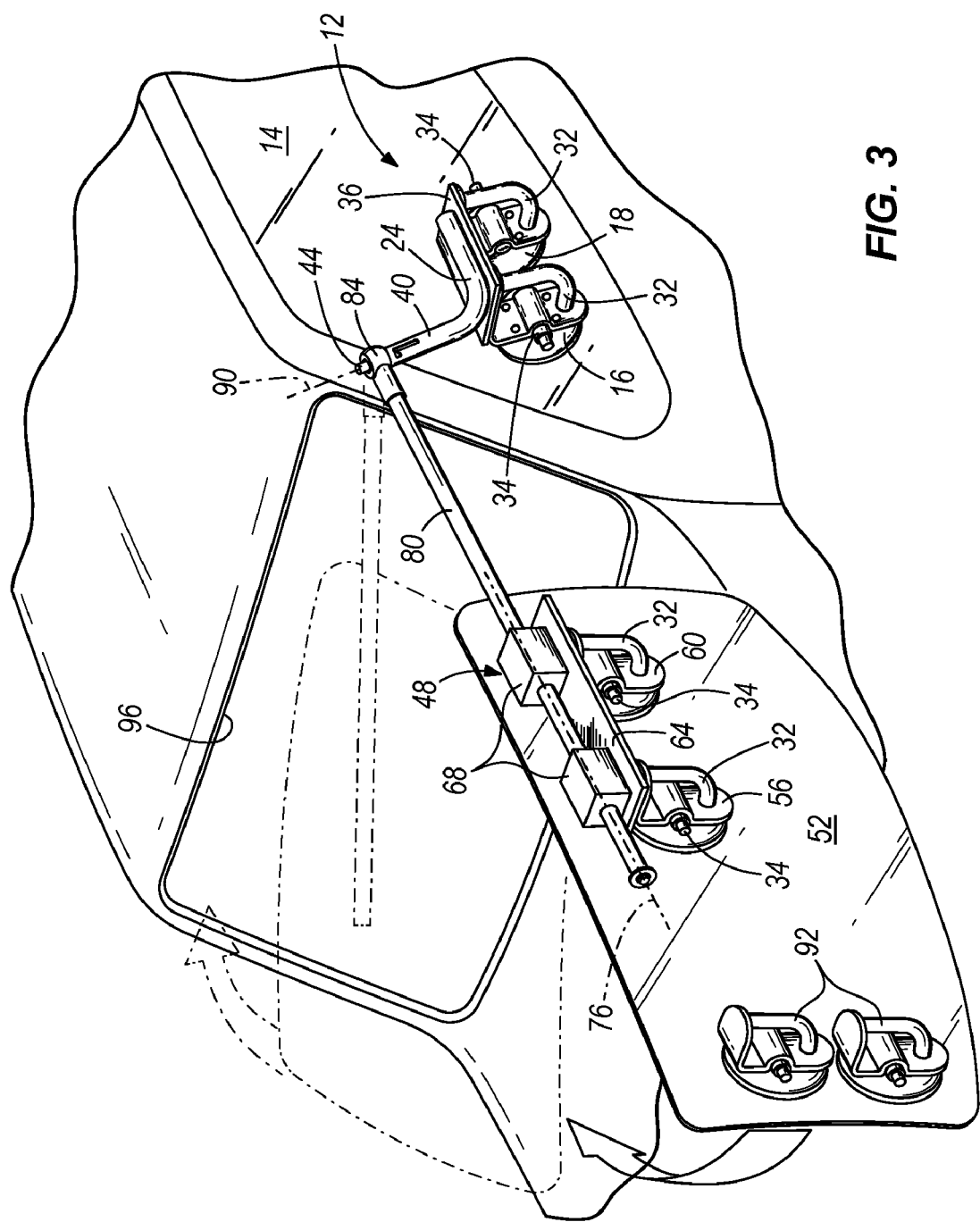
FIG. 3 is a perspective view of the windshield installation device supporting a windshield for installation in a vehicle.
Figure 4:
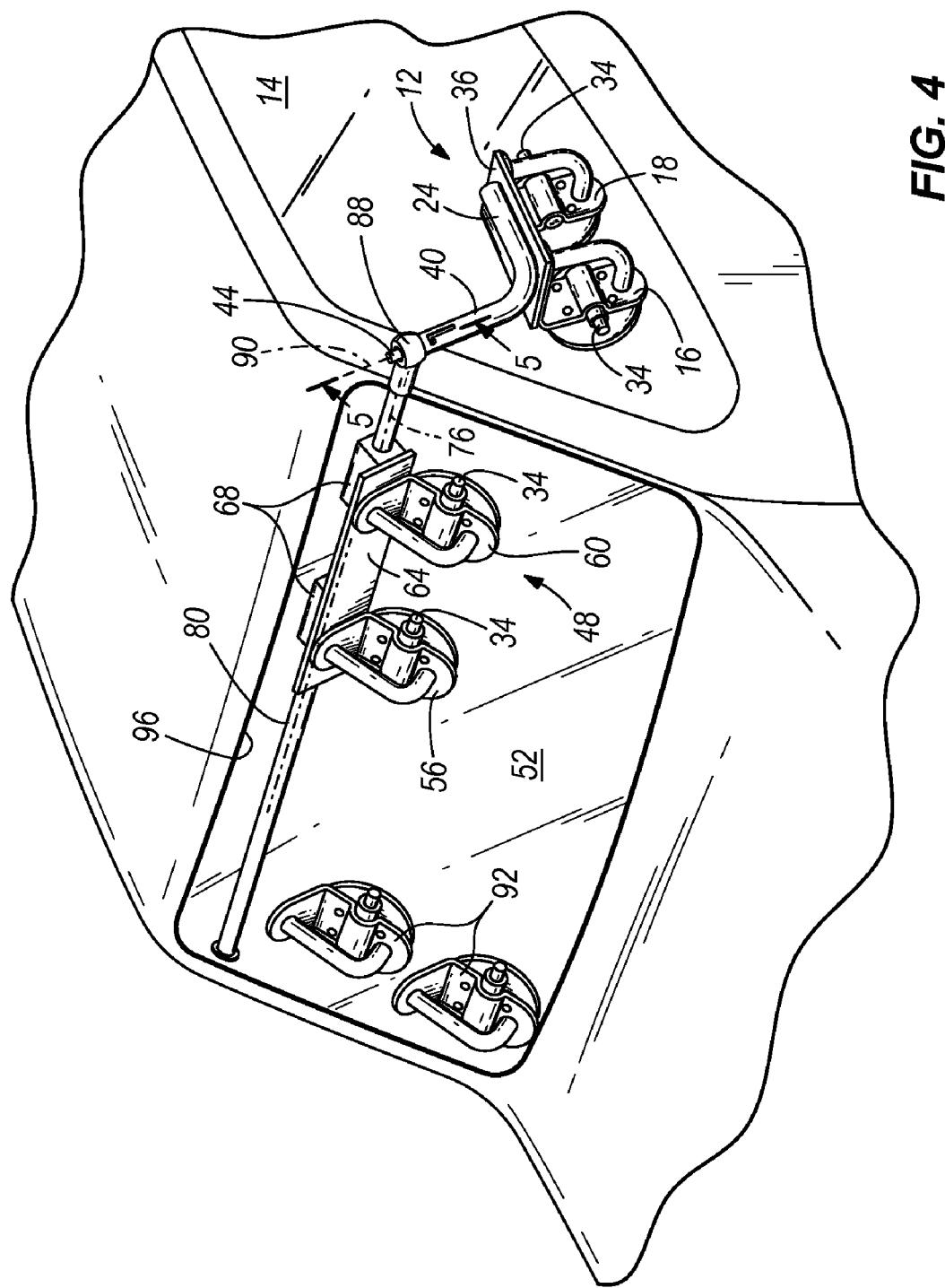
FIG. 4 is a perspective view of the windshield installation device with the windshield positioned for installation in the vehicle.

Referring also to FIGS. 3 and 4, the support assembly 48 and the additional suction members 92 are coupled to the windshield 52, and the pivot assembly 12 is coupled to the side window 14, all by way of manually operating the vacuum devices 34. The pivot assembly 12 is positioned on the side window 14 so that the depending portion 40 extends upwardly and forwardly from the plate 36, adjacent a windshield opening 96. The support rod 80 is moved axially within the support blocks 68 so that the end portion 84 extends past a side edge of the windshield 52. The windshield 52 is manually lifted using the handles 32 of the third and/or fourth suction members 56, 60 and/or the additional suction members 92, and the end portion 84 of the support rod 80 is positioned over the cylindrical portion 44 of the pivot member 24. The windshield 52 is thereafter at least partially supported by the pivot member 24 and can be pivoted about the axis 90 of the cylindrical portion 44.

With the support rod 80 engaged with the pivot member 24, the windshield 52 is manipulated from the position illustrated in FIG. 3 into an installation position over the windshield opening 96 as illustrated in FIG. 4. Manipulating the windshield 52 in this manner will generally include pivoting the windshield 52 and the support assembly 48 about the pivot member 24, sliding the support rod 80 axially within the support blocks 68, and also rotating the windshield 52 about the axis 76. The pivotal engagement between the support rod 80 and the pivot assembly 12, along with the sliding and rotating engagement between the support rod 80 and the support blocks 68 movably supports the windshield 52 in such a way that the windshield 52 can be installed by a single technician. More specifically, the technician can first engage the end portion 84 with the pivot member 24, and can then grasp the additional suction members 92 while walking around the forward portion of the vehicle, thereby pivoting the support rod 80 about the pivot member 24. From the opposite side of the vehicle as the pivot assembly 12, the windshield 52 can be rotated about the axis 76 and moved axially along the support rod 80 until the windshield 52 is properly positioned above the windshield opening 96.

Although the installation device 10 is shown and described herein as facilitating installation of a windshield in an automotive vehicle, it should be appreciated that the device 10 can be utilized in a variety of other applications in which it is desired to at least partially support an object in a moveable manner to facilitate installation or general manipulation thereof.

Various features of the invention are set forth in the following claims.

What is claimed is:

1. A windshield installation device for a vehicle windshield, the vehicle including a side window, the device comprising:
   a first assembly including first and second suction members for coupling to the side window, the first assembly including a support member and a retractable pin coupled to the support member; and
   a second assembly including a third suction member for coupling to the windshield and a support member coupled to the third suction member, the support member adapted to be coupled to the first assembly during windshield installation.

2. The windshield installation device of claim 1, wherein the first assembly includes a member coupled to the first and second suction members and including a depending portion to which the support member is coupled during windshield installation.

3. The windshield installation device of claim 2, wherein the support member includes an end portion adapted to be coupled to the depending portion to at least partially support the windshield during windshield installation.

4. The windshield installation device of claim 3, wherein the depending portion is generally cylindrical and defines an axis, and wherein the end portion defines a bore that receives the depending portion to allow pivotal movement of the second assembly about the axis.

5. The windshield installation device of claim 1, wherein the second assembly includes support blocks that define a bore adapted to receive the support member and allow axial and rotational movement of the support member with respect to the third suction member.

6. The windshield installation device of claim 1, further comprising a fourth suction member for coupling to the windshield, and wherein the third and fourth suction members are coupled to one another by a plate.

7. The windshield installation device of claim 6, wherein a first plane defined by the plate is at an obtuse angle with respect to a second plane defined by the windshield.

8. The windshield installation device of claim 6, wherein a pair of support blocks are coupled to the plate and define a support bore, and wherein each support block includes at least one bearing that slidingly receives and rotatably supports the support member.

9. The windshield installation device of claim 1, wherein the suction members each include a manually actuated vacuum pump for removing air from between the suction member and the side window or the windshield.

10. The windshield installation device of claim 1, wherein the support member comprises a cylindrical rod having a fixed length.

11. A method for installing a windshield on a vehicle, the vehicle including a windshield opening and a side window, the method comprising:
    attaching a first assembly to the side window, the first assembly including a support member supported by at least one suction member and a retractable pin extending from an end of the support member;
    attaching a second assembly to the windshield, the second assembly including a suction member and a rod supported by the suction member;
    positioning the rod on the support member;
    positioning the windshield adjacent the windshield opening; and
    retracting the retractable pin to secure the windshield to the windshield opening.

12. The method of claim 11, wherein the support member includes a depending portion and the rod includes an end portion, and wherein positioning the rod on the support member includes engaging the end portion with the depending portion.

13. The method of claim 11, wherein positioning the rod on the support member includes at least partially supporting the windshield with the suction member of the first assembly.

14. The method of claim 11, wherein the suction member of the second assembly supports structure that supports the rod for axial and rotational movement with respect to the suction member of the second assembly, and wherein positioning the windshield includes moving the windshield axially along the rod and rotating the windshield about the rod.

15. The method of claim 11, wherein the second assembly includes a second suction member coupled to the first suction member and adapted to support the rod.

16. The method of claim 11, wherein attaching the first assembly to the side window, and attaching the second assembly to the windshield include operating manually actuated vacuum pumps associated with each suction member, thereby removing air from between the respective suction members and the side window or windshield.

17. The method of claim 11, wherein securing the windshield to the windshield opening includes removing the rod from the support member.

18. A windshield installation device comprising:
- a first assembly including first and second suction members coupled to one another and a member coupled to the first and second suction members, the member including a generally cylindrical depending portion;
- a second assembly including third and fourth suction members coupled to one another;
- a support block coupled to the third and fourth suction members, the support block defining a bore; and
- a rod received within the bore, the support block adapted for rotational and axial movement with respect to the rod.

19. The windshield installation device of claim 18 wherein the rod includes an end portion defining a bore that receives the depending portion, the bore and the depending portion allowing pivotal movement of the rod with respect to the member.

20. The windshield installation device of claim 18, further comprising additional suction members, each additional suction member including a manually actuated vacuum pump and a handle.

21. A windshield installation device for a vehicle windshield, the vehicle including a side window, the device comprising:
- a first assembly including
  - a support member,
  - at least one suction member for coupling to the side window, the suction member coupled to the support member of the first assembly, and
  - a retractable pin coupled to an end of the support member; and
- a second assembly including
  - a support member adapted to be coupled to the first assembly during windshield installation, and
  - at least one suction member for coupling to the windshield, the suction member coupled to the support member of the second assembly.

22. The windshield installation device of claim 21 wherein the support member of the second assembly is configured to be coupled to the retractable pin of the first assembly.

23. The windshield installation device of claim 21 wherein the support member of the first assembly includes a first member and a second member oriented substantially transverse to the first member, the second member including a first end coupled to the first member and a second end, and wherein the retractable pin is positioned within the second end of the second member.

24. The windshield installation device of claim 23 wherein the suction member of the first assembly is coupled to the first member of the support member of the first assembly.

25. The windshield installation device of claim 23 further comprising a plate coupling together the suction member of the first assembly and the support member of the first assembly.

26. The windshield installation device of claim 21 wherein the support member of the second assembly includes an end portion adapted to be coupled to the support member of the first assembly to at least partially support the windshield during windshield installation.

27. The windshield installation device of claim 26 wherein the retractable pin is generally cylindrical and defines an axis, and wherein the end portion defines a bore that receives the retractable pin to afford pivotal movement of the support member of the second assembly about the axis.

28. The windshield installation device of claim 21 wherein the second assembly includes a support block that defines a bore adapted to receive the support member of the second assembly and affords axial and rotational movement of the support member with respect to the suction member of the second assembly.

29. The windshield installation device of claim 28 wherein the support block includes at least one bearing that slidingly receives and rotatably supports the support member of the second assembly.

30. A windshield installation device comprising:
- a first assembly configured to attach to a side window of a vehicle, the first assembly including
  - a support member having a first end and a second end, and
  - a retractable pin coupled to one of the first end and the second end of the support member; and
- a second assembly configured to attach to a windshield of the vehicle, the second assembly including
  - a rod having a first end and a second end, one of the first end and the second end configured to be coupled to the retractable pin and pivot with respect to the retractable pin to position the windshield on the vehicle.

31. The windshield installation device of claim 30 wherein the first assembly includes a suction member configured to attach to the side window.

32. The windshield installation device of claim 30 wherein the second assembly includes a suction member configured to attach to the windshield.

33. The windshield installation device of claim 30 wherein the support member includes a first member and a second member oriented substantially transverse to the first member.

34. The windshield installation device of claim 30 wherein the second assembly includes a support block that defines a bore adapted to receive the rod and affords axial and rotational movement of the rod within the bore.

35. The windshield installation device of claim 34 wherein the support block includes at least one bearing that slidingly receives and rotatably supports the rod.

* * * * *